Aug. 25, 1959   H. WALKER   2,900,705
TOOL HOLDER
Filed Jan. 24, 1958
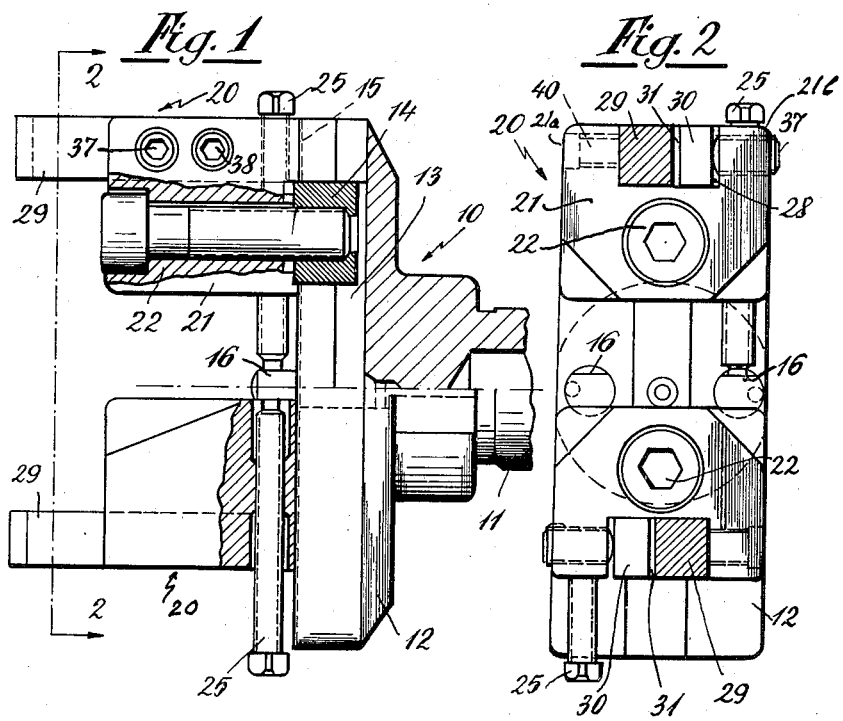
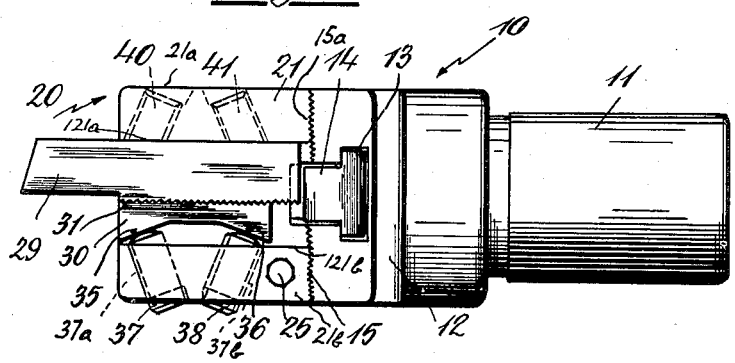
Inventor:
Herman Walker
by:
Michael S. Striker
Attorney

United States Patent Office 2,900,705
Patented Aug. 25, 1959

2,900,705

TOOL HOLDER

Hermann Walker, Esslingen-Waldenbronn, Germany

Application January 24, 1958, Serial No. 711,013

Claims priority, application Germany January 29, 1957

6 Claims. (Cl. 29—96)

The present invention relates to a tool holder, and more particularly to a tool holder for a lathe permitting very accurate adjustment of the position of a cutter held in the tool holder.

Tool holders are known in which the tool is slidable in a guideway of the holder, and can be clamped in adjusted position by a set screw. Tool holders of this type do not permit a very exact adjustment, and moreover, the tool has to be manually adjusted before it is clamped so that after clamping the tool may be slightly shifted again from the desired position. Such manual operation is time-consuming, and cannot be very precise.

It is the object of the present invention to overcome the disadvantages of tool holders of this type, and to provide a tool holder which permits exact adjustment of a tool by a very simple manual operation.

Another object of the present invention is to provide a tool holder permitting longitudinal adjustment, and thereupon clamping of a tool, by threaded means.

Another object of the present invention is the provision of a tool holder which permits exact adjustment of a tool held therein in a plurality of different positions.

Another object of the present invention is the provision of a tool holder which permits exact adjustment of a tool held therein in a plurality of different positions.

With these objects in view, the present invention mainly consists in a tool holder which comprises supporting means including a body having two opposite wall portions, at least one of the wall portions having a guide face slidably engaging a tool; a clamping member having a first surface frictionally engaging another face of the tool, and a second surface having two opposite surface portions inclined to each other and to the guide face; and combined attaching and adjusting means having a first position engaging only one of the inclined surface portions, a second position engaging only the other of the inclined surface portions, and a third position engaging both inclined surface portions. The combined attaching and adjusting means are movable in each of said positions toward the respective engaged inclined surface portion to urge the clamping member into frictional engagement with the tool. In the first and second positions of the combined attaching and adjusting means, the tool is advanced and retracted, respectively, when the combined attaching and adjusting means are operated. In the third position of the combined attaching and adjusting means operation thereof will effect clamping of the tool since the forces acting on the inclined surface portions are directed opposite to each other.

According to a preferred embodiment of the present invention, the combined attaching and adjusting means are two screws respectively engaging the inclined surface portions of the clamping member. When one of the screws is advanced toward the respective associated inclined surface portion, while the other screw is retracted, the clamping member will slide together with the tool along the guide face in one direction, while an opposite movement of the tool and clamping member is obtained by reversing the conditions. When both screws are urged against the associated inclined surface portions, the axial components of the forces are directed in opposite directions so that the tool is immovably clamped between the clamping member and the respective wall portion.

In order to assure a movement of the tool together with the clamping member, the friction between the clamping member and the tool must be greater than the friction between the tool and the guide face. The respective surface of the clamping member is consequently rough, and preferably serrated. It is advantageous to provide the tool with a corresponding serrated face engaging the serrated surface of the clamping member so that no relative movement between the tool and the clamping member is possible. The serrated faces also permit a rough adjustment of the position of the tool.

In accordance with a preferred embodiment of the present invention, the supporting means of the body include a carrier in which the above-mentioned body is slidably mounted for movement in a direction transverse to the main adjustment of the tool. The supporting means are preferably so constructed that the tool can be turned about the longitudinal axis through 180°, and that the body can be turned on the carrier through an angle of 180°.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a side view of a preferred embodiment of the present invention, partly shown in section;

Fig. 2 is an end view of the embodiment shown in Fig. 1 taken on line 2—2 in Fig. 1 with the cutting tool in section; and Fig. 3 is a plan view of the tool holder.

Referring now to the drawing, the tool holder 10 has a shaft portion 11 which is hollow and serves for mounting the tool holder on a machine tool, such as a lathe. Shaft portion 11 is part of a carrier 12 which has a guideway of T-shaped cross section 13. A slide member 14 has a corresponding shape and is slidably guided in the guideway 13. A body 21 has a bore passing therethrough in which a bolt 22 is located. The end of bolt 22 is threaded and passes into a corresponding threaded bore in the slide member 14.

The carrier 12 has a guiding surface 15 formed with parallel ridges and grooves extending in direction of the guideway 13, and the body 21 has a corresponding guiding surface formed with parallel ridges and grooves which engage the ridges and grooves in the surface 15. When the threaded bolt 22 is loosened, the body 21 can be moved in direction of the guideway, and when the bolt 22 is tightened, the body 21 is attached to the carrier in a selected position. It is therefore apparent that member 14 is a first part, and member 22 is a second part of attaching means for attaching the body 21 to the carrier. When the bolt 22 is loosened, the body 21 can be turned about its axis through an angle of 180° into a reverse position. A screw 25 passes through a threaded bore in the body 21, and further secures the body 21 in an adjusted position by engaging a stop member 16 which is fixed to the carrier 12.

As clearly shown in Figs. 1 and 2, two tool holders 20 are mounted on the carrier 12, each tool holder adjustably supporting a cutter 29. Since the two tool holders 20 are identical, only one of the two holders 20 will be described in detail.

The body 21 of each tool holder 20 has two wall portions 21a and 21b. The wall portions 21a and 21b have guide faces 121a and 121b, respectively, which are parallel to each other. The guide faces 121a and 121b define a guideway for the tool 29 which slidably engages one of the guide faces, for example the guide face 121a as shown in Fig. 3.

A clamping member 30 is located in the guideway and has a first surface 31, and a second surface including two inclined surface portions 35 and 36, and a central surface portion which is parallel to the guide faces 121a and 121b. The surface 31 is intended to frictionally engage a face of the cutting tool 29, and is preferably serrated to engage a corresponding serrated face on the tool 29. The guide face 121b is not operative in the arrangement shown in Fig. 3, but it will be understood that the tool 29 can be turned together with the clamping member 30 through 180° about a longitudinal axis, so that the guide face 121b slidably engages and guides the tool 29, whereas the clamping member 30 is located opposite the wall portion 21a.

The wall portion 21b has two threaded bores 37a and 37b which are inclined to each other and to the guide face 121b, and preferably substantially perpendicular to the inclined faces 35 and 36. A pair of screws 37 and 38 is mounted in the bores 37a and 37b and respectively cooperate with the inclined surface portions 35 and 36.

The wall portion 21a has corresponding inclined bores 40 and 41, and when the tool 29 is reversed together with the clamping member 30 as previously described, the screws 37 and 38 are threaded into the bores 40 and 41 for cooperation with the inclined surface portions 35 and 36 of the reversed clamping member 30. The tool holding arrangement of the present invention is operated in the following manner:

The position of the tool holders 20 is adjusted in the first direction by loosening the threaded bolt 22 and sliding the tool holder 20 along the surface 15 until a desired position is reached. In this position, the bolt 22 is tightened so that the body 21 is clamped to the carrier 12. Thereupon the position is further secured by the set screw 25.

In order to adjust the tool 29 in longitudinal direction thereof, one of the screws 37, 38 is loosened, and the other screw is turned and urged against the respective associated inclined surface portion. The force exerted by the screw on the clamping member has a transverse component urging the clamping member 30 against the tool 29, and a longitudinal component effecting movement of the clamping member 30 with the tool 29 along the guide face 121a.

If the screw 38 is advanced, while the screw 37 is loosened, the tool 29 is retracted. If the screw 38 is loosened, and the screw 37 is advanced, the tool 29 is advanced. It is evident that such adjustment of the tool is very accurate, and that it is possible to move the tool 29 exactly to a desired position. If such position is reached, the screw which was loosened is tightened and consequently exerts pressure on the respective associated inclined face, such pressure having a longitudinal component counteracting the longitudinal component of the force exerted by the other screw. The two longitudinal force components cancel each other, and the transverse components of the pressure forces are added to each other and urge the clamping member 30 in transverse direction against the tool 29 so that the same is clamped against the guide face 121a. It is apparent that the same operation can be carried out if the tool 29 is placed in sliding engagement with the guide face 121b, and the clamping member 30 is located opposite the guide face 121a. In this event, however, it is necessary to thread the screws 37 and 38 into the bores 40 and 41.

When both screws 37 and 38 are retracted, the serrated surface 31 of the clamping member 30 can be separated from the tool 29. This permits removal of the tool, and insertion of another tool. Furthermore, the position of the tool can be roughly adjusted while the tool is separated from the serrated surface 31, whereupon the serrated face 31 is again brought into engagement with the serrated face of the tool, and a fine adjustment is carried out by means of the screws 37 and 38, as previously described. The serrations are preferably teeth having top angles of 90°, and rounded points.

It will be noted that the inclined surface portions 35 and 36 define obtuse angles with each other and with the guide faces 121a and 121b. Consequently, the transverse force components, which effect clamping of the tool 29, are greater than the longitudinal force components which effect longitudinal adjustment of the tool.

It will be understood that the threaded adjusting means 37 and 38 constitute combined clamping and adjusting means which have three positions, namely a first position engaging the inclined surface portion 35, a second position engaging the inclined surface portion 36, and a third position in which both inclined surface portions are engaged. In a fourth position of the combined clamping and adjusting means, both inclined surface portions 35 and 36 are released.

It will be understood that each of the elements described above, or two or more together, may also find a useful application in other types of tool holders differing from the types described above.

While the invention has been illustrated and described as embodied in a tool holder including threaded clamping and adjusting means for adjusting the position of a tool, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Tool holder comprising, in combination, supporting means including a body having two opposite wall portions, at least one of said wall portions having a guide face adapted to engage a face of a tool for slidably guiding the tool during adjustment; a clamping member having a first surface facing said guide face and a second surface facing the other wall portion, said second surface having two opposite surface portions inclined to each other and to said guide face; and combined clamping and adjusting means mounted on said other wall portion and having a first position engaging only one of said inclined surface portions, a second position engaging only the other of said inclined surface portions and a third position engaging both said inclined surface portions, said combined clamping and adjusting means being movable in each of said positions toward the respective engaged inclined surface portion to urge said first surface of said clamping member into frictional engagement with another face of the tool and to move said clamping member and said tool together along said guide face in said first and second positions of said combined clamping and adjusting means, and to clamp said tool by said clamping member against said guide face in said third position of said combined clamping and adjusting means.

2. Tool holder comprising, in combination, supporting means including a body having two opposite wall portions, one of said wall portions having a guide face adapted to engage a face of a tool for slidably guiding the tool during adjustment; a clamping member having a first surface facing said guide face and a second surface facing the other wall portion, said second surface having two opposite surface portions inclined to each other and to said guide face; and two adjusting means movably mounted on the other wall portion and respectively cooperating with said inclined surface portions, each of said adjusting means being movable toward and away from the respective inclined surface portion so that when any one of said adjusting means is urged against the respective associated inclined surface portion while the other of said adjusting means is spaced from the respective associated surface portion, said first surface of said clamping member frictionally engages another face of said tool, and said clamping member and said tool move together along said guide face, whereas said tool is clamped by said clamping member against said guide face when both adjusting means are urged against the respective associated inclined surface portions.

3. Tool holder comprising, in combination, supporting means including a body having two opposite wall portions, one of said wall portions having a guide face adapted to engage a face of a tool for slidably guiding the tool during adjustment, and the other wall portion having two threaded bores passing therethrough and being inclined with respect to each other and to said guide face; a clamping member having a first surface facing said guide face and a second surface facing the other wall portion, said second surface having two opposite surface portions inclined to each other and to said guide face; and two threaded adjusting means mounted in said threaded bores of said other wall portion and respectively cooperating with said inclined surface portions, each of said adjusting means being movable toward and away from the respective inclined surface portion so that when any one of said adjusting means is urged against the respective associated inclined surface portion while the other of said adjusting means is spaced from the respective associated surface portion, said first surface of said clamping member frictionally engages another face of said tool, and said clamping member and said tool move together along said guide face, whereas said tool is clamped by said clamping member against said guide face when both adjusting means are urged against the respective associated inclined surface portions.

4. Tool holder comprising, in combination, supporting means including a body having two opposite wall portions, each of said wall portions having a guide face adapted to engage a face of a tool for slidably guiding the tool during adjustment, said guide faces being parallel and defining a guideway for the tool, each of said wall portions being formed with two threaded bores passing therethrough and being inclined with respect to each other and to said guide faces; a clamping member having on opposite sides thereof a serrated first surface formed to produce high friction and adapted to engage a corresponding serrated surface of a tool, and a second surface having two opposite surface portions inclined to each other and to said guide faces, said clamping member being located in said guideway with said first surface facing one of said guide faces, and said second surface facing the other of said guide faces and being turnable in said guideway; and two screws located in the two threaded bores in the wall portion having said other guide face, said screws being movable toward and away from one of said inclined surface portions, respectively, and into a position slidably engaging the respective inclined surface portion so that when any one of said screws is urged against the respective inclined surface portion and the other of said screws is spaced from the respective associated surface portion, said first surface of said clamping member frictionally engages another face of said tool, and said clamping member and said tool move together along said one guide face whereas said tool is clamped by said clamping member against said one guide face when both screws are urged against said inclined surface portions.

5. Tool holding arrangement comprising, in combination, supporting means including a carrier, a body slidably mounted on said carrier for movement in a first direction between a plurality of positions, said body and said carrier having guiding surfaces engaging each other and having matching grooves and ridges extending in said first direction, said body having two opposite wall portions, one of said wall portions having a guide face extending in a direction transverse to said first direction and being adapted to engage a face of a tool for slidably guiding the tool during adjustment in longitudinal direction of the tool, and means for attaching said body in one of said positions thereof to said carrier; a clamping member having a first surface facing said guide face and a second surface facing the other wall portion, said second surface having two opposite surface portions inclined to each other and to said guide face at obtuse angles; and two screws mounted in said threaded bores of said other wall portion and respectively cooperating with said inclined surface portions, each of said screws being movable toward and away from the respective inclined surface portion and into a position slidably engaging the respective inclined surface portion so that when any one of said screws is urged against the respective associated inclined surface portion while the other of said screws is spaced from the respective associated surface portion, said first surface of said clamping member frictionally engages another face of said tool, and said clamping member and said tool move together along said guide face whereas said tool is clamped by said clamping member against said guide face when both screws are urged against the respective associated inclined surface portions, each of said screws having an operable head portion projecting from said other wall portion.

6. A tool holding arrangement as set forth in claim 5 wherein said means for attaching said body to said carrier include a first part slidably guided on said carrier for movement in said first direction, and a second part passing through said body so that said body is turnable on said second part whereby said body can be attached to said carrier in two positions turned through an angle of 180°.

References Cited in the file of this patent

UNITED STATES PATENTS

| 911,537 | Brown | Feb. 2, 1909 |
| 1,120,783 | Amborn | Dec. 15, 1914 |
| 2,293,006 | Luers | Aug. 11, 1942 |
| 2,402,650 | Maffia | June 25, 1946 |
| 2,453,722 | Moss | Nov. 16, 1948 |
| 2,783,527 | Davidson | Mar. 5, 1957 |

FOREIGN PATENTS

| 23,126 | Switzerland | Aug. 9, 1901 |
| 924,769 | France | Mar. 17, 1947 |